J. M. GRANTHAM.
SEEDER.
APPLICATION FILED JUNE 30, 1909.
971,990.
Patented Oct. 4, 1910.
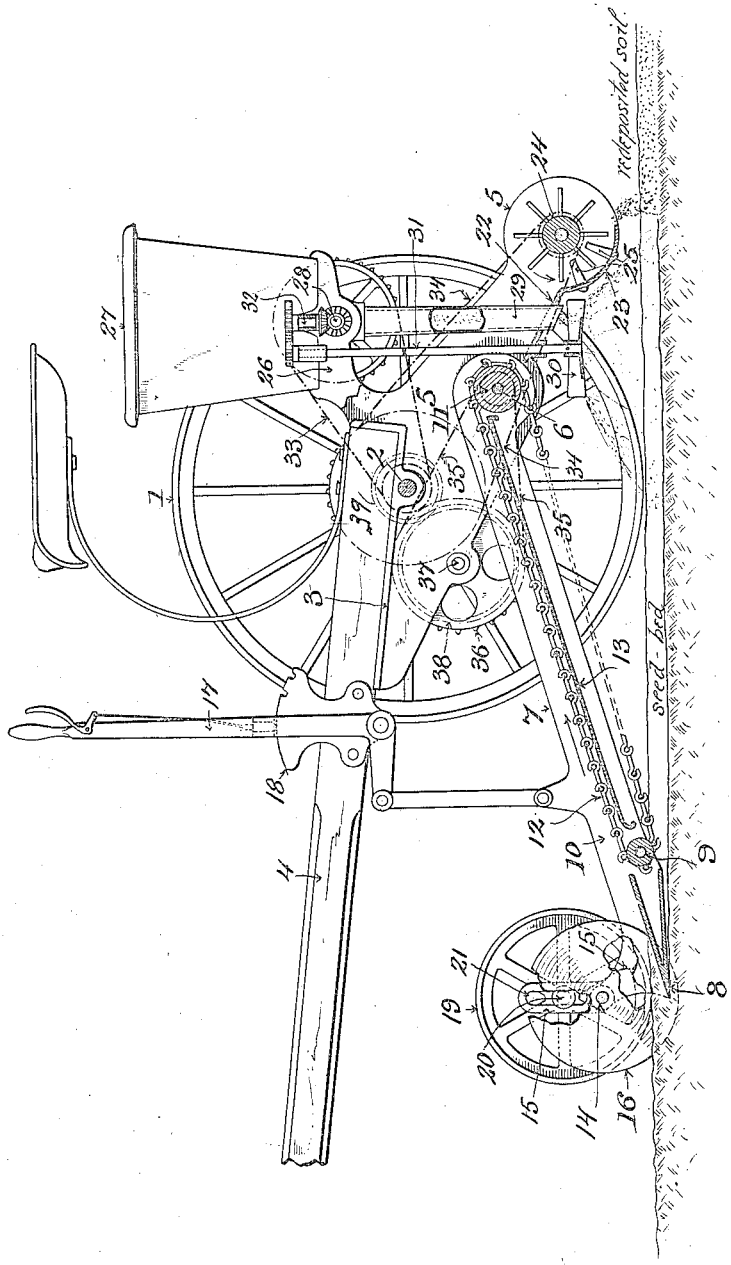

UNITED STATES PATENT OFFICE.

JAMES M. GRANTHAM, OF WAUWATOSA, WISCONSIN.

SEEDER.

971,990. Specification of Letters Patent. Patented Oct. 4, 1910.

Application filed June 30, 1909. Serial No. 505,143.

*To all whom it may concern:*

Be it known that I, JAMES M. GRANTHAM, a citizen of the United States, and resident of Wauwatosa, in the county of Milwaukee and State of Wisconsin, have invented certain new and useful Improvements in Seeders; and I do hereby declare that the following is a full, clear, and exact description thereof.

The object of my invention is to provide a simple, economical and effective machine for seeding grain, etc., the invention consisting in certain peculiarities of construction and combination of parts to be hereinafter fully set forth with reference to the accompanying drawings and subsequently claimed.

It is a well established fact that a large percentage of seeded grain does not mature, due to the irregularity of depth in planting. While broadcast seeding is considered ideal in respect to even distribution over the surface of the ground, in "harrowing or dragging" for the purpose of covering the seed it is impossible to maintain any uniformity of depth in planting. Hence machines for drilling in the seed have, to a large extent superseded the broad-cast method, but in machines of this type it has been found that the drill furrows fill up more or less with soil prior to the seed being deposited therein and thus irregularity in planting is the result. The most serious objection however, in seed-drilling, is due to the fact that the seeds are "bunched" or "clustered" relative to the soil from which they must draw their nourishment and therefore do not receive their individual proportion of the soil's strength and hence much sprouted grain becomes "choked" out.

My invention contemplates overcoming the above mentioned objections in the present methods of seeding, the machine, as illustrated in the drawing, being so constructed and arranged that as it travels forward in its operation, the top layer of soil is lifted for a depth in which it is desired to plant the grain. This elevated soil is then carried rearwardly by a suitable conveyer and deposited back upon the ground from which it had been removed. Prior to the top soil being deposited however, by suitable mechanism, seed grain has been distributed evenly upon the seed-bed or ground from which said top soil was removed, the grain being thereafter uniformly covered by the aforesaid top soil that is discharged from the rear end of the conveyer.

The drawing illustrates a longitudinal sectional view of a seeder embodying the features of my invention.

Referring by numeral to the drawing, 1 indicates one of a pair of truck-wheels which are secured to an axle 2, that is mounted in bearings of a suitable truck-frame 3, there being a draft-pole 4 also secured to the truck-frame. The truck-frame 3 is provided with parallel rearwardly extending arms 5, (one only of which is shown) within which arms is mounted a driven shaft 6, the shaft constituting a hinge-support for the rear end of a conveyer-frame 7. The forward end of the conveyer-frame carries a transversely disposed soil-cutting blade or shovel 8, and located just rearward of the shovel is an idle-roller 9, which roller is hung in suitable bearings therefor in side strips 10 of said conveyer-frame. Another roller 11 is secured to the driven shaft 6 between the side-strips 10 of the frame, which roller together with the idle roller 9 constitute carriers for an endless conveyer 12, the conveyer being shown in the form of a link-belt having cross-rod connections that serve as lags. The upper or driven stretch of the conveyer-belt is supported by an apron 13 that extends from end to end of the conveyer-frame intermediate of the rollers.

A spindle 14 having its bearing in ears 15, that project from the forward ends of the side strips 10, carries a series of cutting disks 16, the cutting-edges of which disks project forward of the shovel 8, said shovel being provided with kerfs through which the disks revolve.

The conveyer-frame and connected parts constitute an elevator for the top soil, the soil being first loosened by means of the disks and thereafter lifted by the shovel 8, which shovel, owing to its forward travel with the machine, delivers said soil to the conveyer-belt, and said belt in turn elevates and carries the same rearward. The forward end of the conveyer-frame is raised or lowered relative to its working position by means of a hand-lever 17 that is linked to said conveyer-frame, the hand-lever being locked when the aforesaid conveyer-frame is lifted from its working position, by means of an ordinary hand-controlled detent and toothed segment 18, which segment is secured to the draft-pole.

In order to hold the cutting-edge of the shovel 8 at a uniform depth in the soil, I provide a pair of supporting caster-wheels 19 for the front end of the conveyer-frame. These casters are revolubly mounted upon studs 20, which studs are adjustably secured in slots 21 formed in the ears 15 of the side-strips of the conveyer-frame. By the above arrangement, it will be seen that the caster-wheels in traveling upon the surface of the ground will automatically raise or lower the cutting-edge of the shovel and owing to their sensitiveness will thus compensate for any unevenness in the soil, whereby said cutting-edge of the shovel and surface of the ground are held parallel, it being understood that the hand-lever 17 is free to swing with the oscillating movement of the conveyer-frame when the machine is in operation.

Those portions of the arms 5 of the truck-frame, rearward of the roller 11, are connected by a downwardly inclined floor 22, which floor in conjunction with the arms 5 constitutes a chute or discharge extension of the elevator upon which soil is discharged from the conveyer-belt as the latter passes around its carrier-roller 11. The floor 22 of the chute terminates with a transversely extending concavo-convex shell 23, into which is fitted a toothed pulverizing roller 24, the teeth of the pulverizing roller being arranged to operate in conjunction with a series of fixed teeth 25 carried by the shell. The pulverizing roller serves as means whereby the soil is thoroughly prepared by being broken up and freed from all clods primary to being discharged from the shell upon the ground. In some instances where the soil is well prepared, the pulverizing mechanism may be dispensed with entirely or I may provide means whereby vibratory motion is imparted to the conveyer-belt incidental to its travel for accomplishing the same result as that attained by the pulverizing roller.

The truck-arms 5 are provided with extension brackets 26 that serve as supports for a seed-box 27, which seed-box is equipped with any well known form of agitator-mechanism that is driven by an arbor 28, the seed-box being also provided with a series of seed-discharge boots 29 that extend through apertures in the chute floor 22 and terminate at such distance from the ground so as to obtain the best results. Each boot 29 discharges seeds upon a suitable broadcast reel 30, the reels being secured to vertically disposed spindles 31 having their bearings in the chute-floor 22 and a boss extension of the adjacent bracket 26. Each spindle, as shown, receives its drive from the arbor 28, through a stud 32, which stud is in bevel-gear connection with said arbor and in spur-gear connection with said spindle. The arbor 28 receives its drive by means of a chain-belt 33, which chain-belt connects a sprocket carried by the truck-axle and a larger sprocket secured to said arbor, the pulverizing-roller 24 being similarly driven by a chain-belt 34 in sprocket-wheel connection with said truck-axle. The driven shaft 6 which carries the conveyer-belt roller 11, receives its motion from the truck-axle by means of a chain-belt 35 in connection with a small sprocket-wheel carried by said shaft and a larger sprocket-wheel 36, which is mounted upon a stud 37 secured to the adjacent truck-frame arm 5, the sprocket-wheel 36 being speeded up by a toothed gear-wheel 38 that meshes with a smaller toothed gear-wheel 39 secured to the aforesaid truck-axle.

The method of gearing whereby motion is imparted to the several parts of the machine forms no part of my invention and may be varied to suit conditions, it being understood however that the speed of the conveyer-belt, in proportion to the diameter of the truck-wheels, should be such that said conveyer-belt will travel and discharge the elevated soil at the same rate of speed as that traveled by the machine in a forward direction, whereby the elevator, in effect, simply passes under the soil and holds it in suspension during a seeding operation.

From the foregoing description, it will be understood that when the seeder is in operation the top soil is lifted the required planting depth and as it travels over the elevator, seed grain is deposited upon the seed bed from which the elevated soil was previously removed, the soil so removed being thereafter replaced upon the seed grain in a uniform layer. Thus all seed grain so planted is, by mechanical means, regularly set at a predetermined planting depth, which depth may be controlled by setting the caster-wheels 19 relative to the point or cutting-edge of the shovel.

I claim:

1. A seeding machine comprising a truck, an adjustable driven conveyer, a soil shovel in connection with the forward end of the conveyer, a pulverizing mechanism into which the conveyer is adapted to discharge, and means for distributing seed under the conveyer.

2. A seeding machine comprising a truck, a traveling elevator in adjustable connection with the truck, whereby soil is lifted, held in suspension and discharged rearwardly, a seeding mechanism carried by the truck, and means in connection with the seeding mechanism whereby seed is distributed upon the ground from which the surface soil has been lifted, the seed distributing means being forward of the point of the soil discharge.

3. A seeding machine comprising soil lifting means, a traveling elevator in connection therewith, a series of seed delivery boots having their discharge ends located upon a plane below the highest point of the traveling elevator and a broad-cast device disposed adjacent to the discharge end of each boot.

4. A seeding machine comprising soil lifting means to provide a seed bed, a traveling elevator in connection with the soil lifting means, and seed delivery means located upon a plane below the highest point of the elevator, the seed delivery means being arranged to discharge forward of the point upon which the soil is returned from said elevator to the seed bed.

In testimony that I claim the foregoing I have hereunto set my hand at Milwaukee, in the county of Milwaukee and State of Wisconsin in the presence of two witnesses.

JAMES M. GRANTHAM.

Witnesses:
GEORGE G. FELBER,
N. E. OLIPHANT.